(12) United States Patent
Reese et al.

(10) Patent No.: US 12,415,385 B2
(45) Date of Patent: Sep. 16, 2025

(54) PNEUMATIC VEHICLE TIRE WITH SPECIFIED BELT BANDAGE

(71) Applicant: Continental Reifen Deutschland GmbH, Hannover (DE)

(72) Inventors: Wolfgang Reese, Peine (DE); Thomas Kramer, Herford (DE)

(73) Assignee: Continental Reifen Deutschland GmbH, Hannover (DE)

( * ) Notice: Subject to any disclaimer, the term of this patent is extended or adjusted under 35 U.S.C. 154(b) by 616 days.

(21) Appl. No.: 17/046,153

(22) PCT Filed: Feb. 4, 2019

(86) PCT No.: PCT/EP2019/052591
§ 371 (c)(1),
(2) Date: Oct. 8, 2020

(87) PCT Pub. No.: WO2019/206477
PCT Pub. Date: Oct. 31, 2019

(65) Prior Publication Data
US 2021/0031563 A1 Feb. 4, 2021

(30) Foreign Application Priority Data
Apr. 27, 2018 (DE) ...................... 10 2018 206 562.4

(51) Int. Cl.
*B60C 9/22* (2006.01)
*B60C 9/20* (2006.01)
(52) U.S. Cl.
CPC ........ *B60C 9/22* (2013.01); *B60C 2009/2214* (2013.01); *B60C 2009/2228* (2013.01);
(Continued)

(58) Field of Classification Search
CPC .... B60C 2009/2271; B60C 2009/2295; B60C 2009/2087; B60C 2009/2029; B60C 9/22; B60C 9/2204
(Continued)

(56) References Cited

U.S. PATENT DOCUMENTS 4,140,168 A * 2/1979 Caretta ........................ 152/531
5,032,198 A * 7/1991 Kojima ................ B60C 9/2204
152/533 X (Continued)

FOREIGN PATENT DOCUMENTS

CN 1882443 A 12/2006
CN 106715152 A 5/2017
(Continued)

OTHER PUBLICATIONS

English machine translation of DE 42 09 817 A1, Sep. 30, 1993.*
(Continued)

*Primary Examiner* — Adrienne C. Johnstone
(74) *Attorney, Agent, or Firm* — Gregory Adams; Richard A. Wolf

(57) ABSTRACT

A pneumatic vehicle tire for passenger cars comprises a carcass, a tread, and a belt which has belt plies and which is covered radially outwardly by a belt bandage having strengthening elements oriented approximately in the circumferential direction, the belt bandage comprising at least one belt bandage ply each consisting of a central section and two lateral sections each arranged next to the central section without overlapping the central section, the strengthening elements of the central section being x1 construction and the strengthening elements of each lateral section being identical cords of x2 or higher construction, the density of the strengthening elements in the central section being less than the density of the strengthening elements in the lateral
(Continued)

sections, and the axial distance of each lateral section inner end from the closest end of the widest belt ply being 5-30 mm.

6 Claims, 1 Drawing Sheet

(52) U.S. Cl.
CPC .............. *B60C 2009/2257* (2013.01); *B60C 2009/2271* (2013.01); *B60C 2009/2285* (2013.01); *B60C 2009/2295* (2013.01)

(58) Field of Classification Search
USPC ................................................ 152/531, 533
See application file for complete search history.

(56) References Cited

U.S. PATENT DOCUMENTS

| | | | | |
|---|---|---|---|---|
| 5,795,417 | A * | 8/1998 | Damke | .............. B60C 9/22 152/533 |
| 2002/0079036 | A1* | 6/2002 | Yukawa | |
| 2006/0225824 | A1 | 10/2006 | Kuwajima et al. | |
| 2007/0095450 | A1 | 5/2007 | Yoshimi | |
| 2010/0065180 | A1 | 3/2010 | Ishiyama et al. | |
| 2011/0240199 | A1* | 10/2011 | Reese | .............. B60C 9/22 |
| 2011/0303339 | A1 | 12/2011 | Valle | |
| 2016/0068020 | A1 | 3/2016 | Reese et al. | |
| 2017/0246913 | A1 | 8/2017 | Reese | |
| 2017/0334247 | A1* | 11/2017 | De Riva-Perez | .... B60C 9/2204 |

FOREIGN PATENT DOCUMENTS

| | | | |
|---|---|---|---|
| DE | 4209817 | A1 | 9/1993 |
| DE | 69301366 | T2 | 5/1996 |
| DE | 112004001712 | T5 | 10/2006 |
| DE | 102016202930 | A1 | 8/2017 |
| EP | 0235579 | A2 | 9/1987 |
| EP | 0 978 396 | A2 * | 2/2000 |
| EP | 2 829 420 | A1 * | 1/2015 |
| EP | 2829419 | A1 | 1/2015 |
| EP | 2848434 | A1 | 3/2015 |
| FR | 2939723 | A1 | 6/2010 |
| JP | 2003182307 | A * | 7/2003 |
| JP | 2004224074 | A | 8/2004 |
| JP | 2005247070 | A | 9/2005 |
| JP | 2007137199 | A | 6/2007 |
| JP | 2007196740 | A | 8/2007 |
| JP | 2009173066 | A | 8/2009 |
| WO | 2014187615 | A1 | 11/2014 |
| WO | WO-2016/074812 | A1 * | 5/2016 |

OTHER PUBLICATIONS

English machine translation of EP 2 829 420 A1, Jan. 28, 2015.*
English machine translation of EP 0 978 396 A2, Feb. 9, 2000.*
English machine translation of JP 2003-182307 A, Jul. 3, 2003.*
English machine translation of JP 2004-224074-A, Aug. 12, 2004.*
"Tire Cord", Kirk-Othmer Encyclopedia of Chemical Technology, 4th ed., vol. 24, John Wiley & Sons, Inc., 1997, p. 163.*
Chinese Office Action dated Oct. 14, 2022 of counterpart CN application 201980027995.1.
International Search Report of PCT application PCT/EP2019/052591 on which this application is based.
CN Notice of Allowance dated Jul. 2023 of counterpart Chinese Application No. 201980027995.1.

* cited by examiner

PNEUMATIC VEHICLE TIRE WITH SPECIFIED BELT BANDAGE

BRIEF SUMMARY

The invention relates to a pneumatic vehicle tire for passenger cars comprising a carcass, a tread and a belt which has belt plies and which is covered radially outwardly by a belt bandage having strengthening elements oriented approximately in the circumferential direction, wherein the belt bandage has at least one belt bandage ply which—as viewed in the tire cross section—consists of three sections, namely a central section and two lateral sections, wherein one lateral section is arranged to the left of the central section and one lateral section is arranged to the right of the central section and wherein the strengthening elements of the central section have the construction x1 and wherein the strengthening elements of the two lateral sections have identical cords consisting of at least two twisted-together yarns.

Such a vehicle tire is known for example from JP 2007 1967 40 A or from JP 2009 1730 66 A. The belt bandage ply is formed from three parts with a central section and two lateral sections, wherein the strengthening elements in the central section have the construction x1 and the strengthening elements of the lateral sections have the construction x2. In JP 2009 1730 66 A, the strengthening elements of all three sections of the belt bandage ply are made of polyamide 6.6 (PA6.6); in JP 2007 1967 40 A, the strengthening elements of the central section consist of PA6.6 and the strengthening elements of the lateral sections consist of polyethylene naphthalate (PEN). This construction of the belt bandage has advantages in terms of road noise, in terms of high-speed performance and also in terms of rolling resistance and flat-spotting. The latter two advantages are achieved by using a strengthening element of the construction x1, since the strengthening element has a smaller diameter than a comparable x2 cord of identical total fineness, resulting in a thinner calendered ply with less rubber material.

However, the edges facing the central section of the two lateral sections are arranged so as to overlap with the central section. This overlapping has a negative effect on the wear of the vehicle tire.

In general, a person skilled in the art is sufficiently familiar with arranging a belt bandage in pneumatic vehicle tires. The belt bandage is formed in one or more plies, covers at least the belt edges and has strengthening members running approximately in the circumferential direction in parallel which are embedded in a rubber mixture. "Approximately in the circumferential direction" refers to an angle of 0° to 5° in relation to the circumferential direction of the tire.

During tire production, the belt bandage is applied in the form of plies, strips or individual strengthening elements with strengthening elements embedded in an unvulcanized rubber mixture, these elements being wound or coiled onto the belt. The strengthening elements are embedded in rubber in that an array of substantially parallel strengthening elements in the form of threads, which are generally thermally pretreated and/or pretreated with an impregnation in a manner known to a person skilled in the art for better adhesion to the embedding rubber, runs in the longitudinal direction through a calender or an extruder for encasing with the rubber mixture. An alternative, however, is to use strengthening elements which have been given adhesive impregnation and can be processed without a calendered adhesion mixture.

The belt bandage serves in particular in high-speed use to limit an elevation of the tire due to the centrifugal forces occurring during driving operation. Moreover, the strengthening elements of the belt bandage are intended to hold down the belt plies, in particular the belt edges, for high-speed strength and durability. For this purpose, larger forces, in particular alternating tensile/compressive loads, have to be bound in the shoulder regions of the pneumatic vehicle tire than in the central region.

It is therefore the object of the present invention to provide a rolling resistance-optimized pneumatic vehicle tire with high-speed strength that comprises a belt bandage and additionally has more uniform wear.

The object is achieved according to the invention in that the two lateral sections are arranged next to the central section, that is to say without overlapping with the central section, in that the density of the strengthening elements in the central section is less than the density of the strengthening elements in the lateral sections, and in that the respective end of the lateral sections that points toward the central section in each case has a distance of 5 mm-30 mm, preferably a distance of 5 mm-15 mm, from the outer end of the widest belt ply, where the distance is measured in the axial direction.

It is essential to the invention that the strengthening elements in the central section have the construction x1 and in the lateral sections have the construction x2 or higher and are arranged without overlapping with one another. At the same time, the density of the strengthening elements in the central section is less than in the lateral sections. By virtue of the fact that an overlapping and hence a local material thickening are dispensed with, the wear is positively influenced. The construction x1 in the central section affords a thinner ply thickness which, together with the greater cord-to-cord distance, provides a considerable rolling resistance advantage.

A "construction x2 or higher" means a construction x3, x4, etc.

In one specific embodiment of the invention, the strengthening elements in the central section have the construction x1 and the strengthening elements in the two lateral sections have the construction x2.

By virtue of the fact that an overlapping and hence a local material thickening are dispensed with, the wear is positively influenced. The construction x1 in the central section affords a thinner ply thickness which, together with the greater cord-to-cord distance, provides a considerable rolling resistance advantage. In this respect, a construction example is contained in the single table.

In an alternative embodiment of the invention, the strengthening elements in the central section have the construction x1 and the strengthening elements in the two lateral sections have the construction x3 or x4. This achieves a further increase in the fatigue resistance in the lateral sections. A construction example in this respect of the strengthening elements in dtex is a strengthening element 470x3 in the lateral sections and 1400x1 in the central section.

It is advantageous if the (total) fineness of strengthening element of the central region by comparison with the (total) fineness of each strengthening element of the lateral sections has a difference of 1-50%, preferably of 0-30%, particularly preferably of 0-10%, very particularly preferably of 0-3%, wherein in the case of different (total) finenesses of the strengthening elements of the central region with respect to the lateral region, the (total) fineness of the strengthening elements of the lateral sections is greater (that is to say is thicker).

In one specific embodiment of the invention, the strengthening elements of the central section and the strengthening elements of the lateral sections are made of the same material, such as for example of polyamide, preferably PA6.6, PA or polyester (PES), preferably polyethylene terephthalate (PET). Construction examples are in dtex lateral section PA6.6/central section PA6.6: 235x2/470x1, 350x2/700x1, 470x2/940x1, 700x2/1400x1, 940x2/1880x1, 1400x2/2800x1.

In another embodiment of the invention, the strengthening elements of the central section are made of a different material than the strengthening elements of the lateral sections, such as for example the lateral sections being made of PA6.6 and the central section being made of PET or PA6. Construction examples for this are in dtex lateral section PA6.6/central section PET: 235x2/550x1, 350x2/720x1, 470x2/1100x1, 700x2/1440x1, 940x2/1670x1, 1400x2/2200x1.

The higher thermal stability of PET by comparison with PA6.6 affords flat-spot advantages. Moreover, PET absorbs less moisture, or transport thereof is less in relation to PA6.6, resulting in advantages in terms of possible corrosion of the belt.

It is advantageous if the strengthening elements of the central region have the construction 470 dtex x1 and the strengthening elements of the lateral sections have the construction 235 dtex x2 or if the strengthening elements of the central region have the construction 700 dtex x1 and the strengthening elements of the lateral sections have the construction 350 dtex x2 or if the strengthening elements of the central region have the construction 940 dtex x1 and the strengthening elements of the lateral sections have the construction 470 dtex x2 or if the strengthening elements of the central region have the construction 1400 dtex x1 and the strengthening elements of the lateral sections have the construction 700 dtex x2 or if the strengthening elements of the central region have the construction 1880 dtex x1 and the strengthening elements of the lateral sections have the construction 940 dtex x2.

The x2, x3 or x4 construction in the lateral sections is more resistant to dynamic alternating tensile/compressive loading. They fatigue less quickly and the durability of the tire is improved. The x1 construction in the central region is advantageous for the rolling resistance and, by virtue of a lower shrinkage, advantageous for flat-spotting.

It is expedient if the belt bandage has the construction 1-1-1 or 2-2-2 or 2-1-2 or 3-2-3. This means that the belt bandage can be readily adapted to the desired requirements. Here, the stated number corresponds to the number of belt bandage sections lying over one another and the enumeration corresponds to the order: lateral section-central section-lateral section.

The twist factor α of each multifilament yarn or of the cord lies in a range from 80 to 270, preferably in a range from 140 to 210, for a x2 cord, and in a range from 10 to 100, preferably in a range from 30 to 80, for a x1 strengthening element, where α=twist [t/m]×(fineness [tex]/1000)$^{1/2}$.

For the exemplary embodiment in the following table, the twist factor α for the strengthening elements of the lateral sections is 150+/−70 and for the strengthening elements of the central section 40+/−30.

For the material PET, the twist factor α for the strengthening elements of the lateral sections is 200+/−70 and for the strengthening elements of the central section 70+/−30. Exemplary embodiments for PA6.6 strengthening element lateral sections/PET strengthening element central section are: 235x2/550x1, 350x2/720x1, 470x2/1100x1, 700x2/1440x1, 940x2/1670x1, 1400x2/2200x1

The following table specifies a preferred exemplary embodiment of the belt bandage with a belt bandage ply of the construction 1-1-1 of a vehicle tire according to the invention:

TABLE

|  | Lateral sections | Central section |
| --- | --- | --- |
| Material | PA6.6 | PA6.6 |
| Strengthening element construction | 470dtex x2 | 940dtex x 1 |
| Density in epdm | 130 | 120 |
| Diameter of the strengthening element in mm | 0.40 | 0.30 |
| Shrinkage in % | 5.0 | 3.8 |
| Res. Shrinkage in % | 2.5 | 2.1 |

The construction 1-1-1 means: 1 ply lateral section-1 ply central section-one ply lateral section.

BRIEF DESCRIPTION OF THE SEVERAL VIEWS OF THE DRAWING(S)

Further features, advantages and details of the invention will now be described in more detail on the basis of the figures, which illustrate a schematic exemplary embodiment. In the figures.

DETAILED DESCRIPTION

Figure 1:
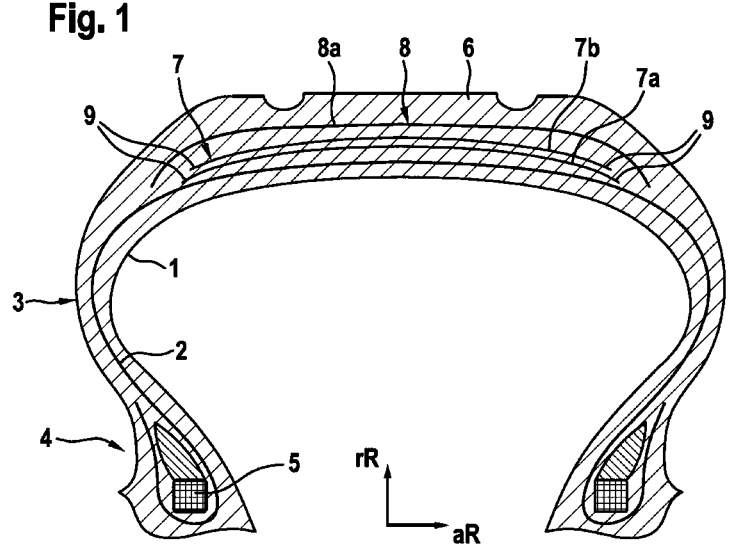
FIG. 1 shows a cross section through a pneumatic vehicle tire.
Figure 2:
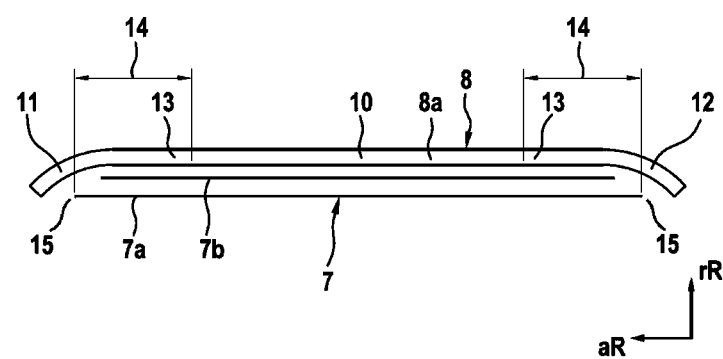
FIG. 2 shows a cross section through the belt and the belt bandage of the pneumatic vehicle tire of FIG. 1.

FIG. 1 shows a cross section through a pneumatic vehicle tire for a passenger car, whereas FIG. 2 shows a cross section through the belt and the belt-covering belt bandage of the pneumatic vehicle tire of FIG. 1. Both figures are described together below. The essential components from which the depicted pneumatic vehicle tire is composed are a largely air-impermeable inner layer 1, a carcass 2 which conventionally reaches from the region of the crown of the pneumatic vehicle tire over the sidewalls 3 into the bead regions 4 and is anchored there by wrapping around high-tensile bead cores 5, a profiled tread 6 located radially above the carcass 2 and a belt 7 arranged between the tread 6 and the carcass 2 and comprising two belt plies 7a, 7b which is radially outwardly covered by a belt bandage 8 which comprises a single belt bandage ply 8a. The belt bandage ply 8a covers the belt along with its belt edges 9. The belt bandage ply 8 has strengthening elements (not shown) which are wound parallel and approximately in the circumferential direction of the pneumatic vehicle tire along its axial width.

The belt bandage ply 8a consists of three sections arranged next to one another: a central section 10 and in each case a lateral section 11, 12 adjoining the central section 10. The belt bandage ply 8a thus has the construction 1-1-1. The two lateral sections 11, 12 are thus arranged without overlapping with the central section 10. The end 13 of the lateral sections that points in each case toward the central section 10 in each case has a distance 14 of 5 mm-15 mm from the closest outer end of the widest belt ply 15, where the distance 14 is measured in the axial direction aR. The strengthening elements in the central section 10 have the construction x1 and the strengthening elements in the two lateral sections 11, 12 have the construction x2, with all the strengthening elements of the belt bandage ply 8a consisting of the same material, of PA6.6. The total fineness of each strengthening element is 940 dtex. The construction of each strengthening element in the lateral sections 11, 12 is 470 dtex x2 and the construction of each strengthening element in the central section 10 is 940 dtex x1. By virtue of the different construction of the strengthening elements in the central section 10 with respect to the lateral section 11, 12, the result is a diameter of the strengthening element in the lateral section 11, 12 of 0.40 mm and in the central section 10 of 0.30 mm. The strengthening elements are arranged in the lateral section 11, 12 in a density of 130 epdm and in the central section 10 with a density of 120 epdm. "epdm" stands for ends per decimeter and describes the density in which the strengthening elements are arranged in the reinforcing ply.

LIST OF REFERENCE SIGNS (Part of the Description)
- 1 Inner layer
- 2 Carcass
- 3 Sidewall
- 4 Bead region
- 5 Bead core
- 6 Tread
- 7 Belt
- 7a 1st Belt ply
- 7b 2nd Belt ply
- 8 Belt bandage
- 8a Belt bandage ply
- 9 Belt edge
- 10 Central section
- 11 Lateral section
- 12 Lateral section
- 13 End of the lateral section
- 14 Distance
- 15 End of the widest belt ply
- rR Radial direction
- aR Axial direction

The invention claimed is:

1. A pneumatic vehicle tire for passenger cars comprising:
a carcass;
a tread;
a belt having belt plies and covered radially outwardly by a belt bandage having strengthening elements oriented at an angle of 0° to 5° with respect to a circumferential direction of the tire;
the belt bandage comprises a belt bandage ply consisting of a first lateral section, a central section and a second lateral section, the central section between the first lateral section and the second lateral section, the first and second lateral sections arranged next to the central section without overlapping the central section;
the density of the strengthening elements in the central section is less than the density of the strengthening elements in the first and second lateral sections;
the central strengthening elements are polyethylene terephthalate (PET) and have a x1 construction, and the lateral strengthening elements are identical cords and have a construction of x2 or higher;
the axial distance of each lateral section inner end from the closest end of the widest belt ply is 5 mm to 15 mm; and
the fineness of each lateral strengthening element is 0-10 percent greater than that of each central strengthening element.

2. The tire of claim 1, wherein the lateral strengthening elements are polyamide 6.6 (PA6.6).

3. The tire of claim 2, wherein the lateral strengthening elements have a x2 construction.

4. The tire of claim 1, wherein the central strengthening elements each have a fineness of 940 dtex.

5. The tire of claim 1, wherein the central strengthening elements each have a twist factor $\alpha$ in a range of from 10 to 100, and wherein $\alpha=\text{twist } [t/m]\times(\text{fineness [tex]}/1000)^{1/2}$.

6. The tire of claim 1, wherein:
the lateral strengthening elements are polyamide 6.6 (PA6.6); and
the belt bandage construction is 1-1-1.

* * * * *